United States Patent
Tittenhofer et al.

(10) Patent No.: US 11,573,384 B2
(45) Date of Patent: Feb. 7, 2023

(54) QSFP-DD (QUAD SMALL FORM FACTOR PLUGGABLE-DOUBLE DENSITY) MODULES AND METHODS THEREFOR

(71) Applicant: Cisco Technology, Inc., San Jose, CA (US)

(72) Inventors: Michael Tittenhofer, Fuerth (DE); Theodor Kupfer, Feucht (DE); Viktor Brauer, Nuremberg (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 118 days.

(21) Appl. No.: 17/231,594

(22) Filed: Apr. 15, 2021

(65) Prior Publication Data

US 2021/0231891 A1 Jul. 29, 2021

Related U.S. Application Data

(62) Division of application No. 16/674,568, filed on Nov. 5, 2019, now Pat. No. 11,036,017.

(30) Foreign Application Priority Data

Nov. 9, 2018 (GB) ..................................... 1818266

(51) Int. Cl.
*G02B 6/42* (2006.01)
*H01R 13/514* (2006.01)
*H01R 43/26* (2006.01)

(52) U.S. Cl.
CPC ......... *G02B 6/4271* (2013.01); *G02B 6/4278* (2013.01); *H01R 13/514* (2013.01); *H01R 43/26* (2013.01)

(58) Field of Classification Search
CPC ............... H05K 7/1489; H05K 7/1492; H05K 7/20554; H05K 7/20736; H05K 7/20836; G06F 1/18; G02B 6/4271; G02B 6/4278; H01R 13/514; H01R 43/26
USPC ...... 439/577, 607.2, 607.21, 607.24; 385/92, 385/99, 14; 361/715, 702
See application file for complete search history.

(56) References Cited

U.S. PATENT DOCUMENTS

| | | |
|---|---|---|
| 7,325,983 B1 | 2/2008 | Dallesasse et al. |
| 7,359,641 B2 | 4/2008 | Dallesasse et al. |
| 7,433,193 B2 | 10/2008 | Yee et al. |
| 8,358,504 B2 | 1/2013 | McColloch et al. |

(Continued)

FOREIGN PATENT DOCUMENTS

| | | |
|---|---|---|
| GB | 2419470 A | 4/2006 |
| KR | 1020130084870 A | 7/2013 |
| WO | 2016105567 A1 | 6/2016 |

OTHER PUBLICATIONS

Combined Search and Examination Report in counterpart GB Application No. 1818266.7, dated May 10, 2019, 9 pages.

(Continued)

*Primary Examiner* — Gary F Paumen
(74) *Attorney, Agent, or Firm* — Edell, Shapiro & Finnan, LLC (57) ABSTRACT

In one embodiment, a module for plugging into a QSFP-DD (Quad Small Form Factor Pluggable Double Density) cage is provided that has one or more projections for contacting a QSFP-DD optical module in an adjacent QSFP-DD recess of the QSFP-DD cage so as to evacuate heat from, and or provide power to, the QSFP-DD optical module.

20 Claims, 9 Drawing Sheets

(56) References Cited

U.S. PATENT DOCUMENTS

| | | | |
|---|---|---|---|
| 8,467,190 B2 | 6/2013 | Yi et al. | |
| 9,929,500 B1* | 3/2018 | Ista | H01R 13/6271 |
| 10,128,627 B1* | 11/2018 | Kazav | G02B 6/4261 |
| 10,444,453 B1* | 10/2019 | Khamaisee | H04B 10/801 |
| 10,690,868 B1* | 6/2020 | Goergen | G02B 6/4436 |
| 11,036,017 B2* | 6/2021 | Tittenhofer | G02B 6/4271 |
| 2006/0126306 A1 | 7/2006 | Blair et al. | |
| 2018/0188465 A1* | 7/2018 | Zer | H04Q 11/0071 |
| 2020/0113077 A1 | 4/2020 | Tittenhofer et al. | |

OTHER PUBLICATIONS

SFF Committee, "Specification for QSFP+ 4X 10 Gb/s Pluggable Transceiver", SFF-8436, Rev 4.9, Aug. 31, 2018, 38 pages.

SFF Committee, "INF-8438i Specification for QSFP (Quad Small Formfactor Pluggable) Transceiver", Rev 1.0, Nov. 2006, 76 pages.

QSFP-DD MSA, "QSFP-DD Hardware Specification for QSFP Double Density 8X Pluggable Transceiver", Rev 3.0, Sep. 19, 2017, 69 pages.

Nowell, Mark et al., "QSFP-DD: Enabling 15 Watt Cooling Solutions", QSFP-DD MSA, Mar. 12, 2018, 20 pages.

* cited by examiner

QSFP-DD (QUAD SMALL FORM FACTOR PLUGGABLE-DOUBLE DENSITY) MODULES AND METHODS THEREFOR

PRIORITY CLAIM

This application is a divisional of U.S. application Ser. No. 16/674,568, filed Nov. 5, 2019, which claims priority to United Kingdom Patent Application No. 1818266.7, filed Nov. 9, 2018. The entirety of each of these applications is incorporated herein by reference.

TECHNICAL FIELD

The present disclosure relates to QSFP-DD (Quad Small Form Factor Pluggable Double Density) modules. In particular, but without limitation, the present disclosure relates to approaches and apparatus for cooling and/or powering a QSFP-DD optical module.

BACKGROUND

QSFP-DD optical modules are compact hot pluggable devices for plugging into network hardware such as servers and switches and interfacing with fibre optic cables. In particular, a given QSFP-DD optical module would be plugged into a QSFP-DD recess in a cage of a network device so as to provide an interface between the network device and a fibre optic cable. The network device's cage may have a plurality of QSFP-DD recesses for receiving multiple QSFP-DD optical modules at the same time. The form factor and electrical interface of QSFP-DD optical modules and receptacles therefor are specified by a Multi-Source Agreement (MSA).

BRIEF DESCRIPTION OF THE FIGURES

Examples of the present disclosure will now be explained with reference to the accompanying drawings in which:

FIG. 6a is a cut-away perspective view of a QSFP-DD module having a thermoelectric cooling element and FIG. 6b illustrates heat flow within the QSFP-DD module of FIG. 6a;

FIG. 9 shows a cutaway perspective view of the arrangement of FIG. 8a.

Throughout the description and the drawings, like reference numerals refer to like parts.

DESCRIPTION OF EXAMPLE EMBODIMENTS

Overview

In overview, approaches and apparatus for evacuating heat from and/or providing electrical power to the components of a QSFP-DD optical module are provided. In particular, the flat portion on the upper side of the shell of a QSFP-DD optical module that, when the optical module is plugged into a QSFP-DD cage, remains outside of the QSFP-DD cage is used in order to evacuate heat and/or provide electrical power.

A module arranged to plug into an optical module QSFP-DD recess of a QSFP-DD cage having a plurality of optical module QSFP-DD recesses is provided. The module has one or more projections arranged so that, when the module is plugged into one of the optical module QSFP-DD recesses and a QSFP-DD optical module is plugged into an adjacent one of the optical module QSFP-DD recesses, the one or more projections contact the QSFP-DD optical module. This enables an otherwise vacant QSFP-DD recess that is adjacent to a QSFP-DD recess being occupied by a QSFP-DD optical module to be used to enhance the performance of the QSFP-DD optical module—for example by providing an increased cooling capability and/or by providing more electrical power than could otherwise be supplied to the QSFP-DD optical module.

A method is provided that comprises: inserting the above module into a QSFP-DD optical module recess in a network device when a QSFP-DD optical module is plugged into an adjacent QSFP-DD optical module recess of the network device; or inserting a QSFP-DD optical module into a QSFP-DD optical module recess in a network device when the above module is plugged into an adjacent QSFP-DD optical module recess of the network device.

A QSFP-DD optical module arranged to plug into an optical module QSFP-DD recess of a QSFP-DD cage is provided. The QSFP-DD optical module having: an optical interface for interfacing with an optical fibre; an electrical interface for interfacing with an electrical interface of a QSFP-DD cage when the QSFP-DD optical module is plugged into a QSFP-DD recess of the QSFP-DD cage; conversion circuitry for converting at least one of: optical signals received at the optical interface from an optical fibre into electrical signals for outputting by the electrical interface, and electrical signals received at the electrical interface from the electrical interface of the QSFP-DD cage into optical signals for outputting by the optical interface; and a shell having a flat portion that is arranged to project outside the QSFP-DD recess of the QSFP-DD cage when the QSFP-DD optical module is plugged thereinto; wherein the flat portion has one or more electrical contacts for receiving electrical power and providing it to the conversion circuitry.

A method for configuring a QSFP-DD optical module and apparatus for performing the method are provided. The QSFP-DD module comprising: an optical interface for interfacing with an optical fibre; an electrical interface for interfacing with an electrical interface of a QSFP-DD cage when the QSFP-DD optical module is plugged into a QSFP-DD recess of the QSFP-DD cage; conversion circuitry for converting at least one of: signals received at the optical interface from an optical fibre into signals for outputting by the electrical interface, and signals received at the electrical interface from the electrical interface of the QSFP-DD cage into signals for outputting by the optical interface; and a shell having a flat portion that is arranged to project outside the QSFP-DD recess of the QSFP-DD cage when the QSFP-DD optical module is plugged thereinto, the method comprising attaching to the flat portion of the QSFPP optical module one or more of: a heat sink for evacuating heat from the QSFPP optical module; and one or more electrical contacts for providing electrical power to the conversion circuitry.

Example Embodiments

Figure 1:
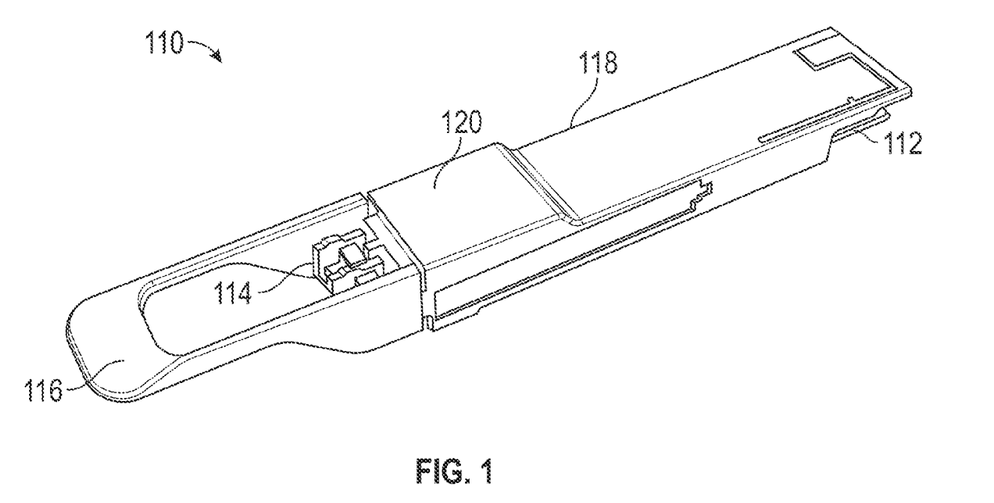
FIG. 1 is a perspective view of a QSFP-DD optical module.

FIG. 1 shows a perspective view of a QSFP-DD optical module 110 seen from above. The QSFP-DD optical module has an electrical interface 112 comprising a plurality of pins (not shown) for providing electrical communication between the QSFP-DD optical module 110 and a network device (not shown) when the QFSP optical module 110 is inserted into a QSFP-DD recess of a cage of the network device. The QSFP-DD optical module 110 also has an optical interface 114 for providing optical communication between the QSFP-DD module 110 and a fibre optic cable (not shown) when the fibre optic cable is plugged into the optical interface 114. The QSFP-DD optical module has a handle 116 to facilitate the plugging in and removal of the QSFP-DD optical module from a QSFP-DD recess of a cage of a network device. As can be seen, the bottom of the handle 116 is approximately flush with the bottom of the QSFP-DD optical module 110. The innards of the QSFP-DD optical module 110 are encased in a shell 118. When the QSFP-DD optical module 110 is plugged into a QSFP-DD recess of a cage of a network device, the electrical interface 112 and a portion of the shell 118 enter inside the QSFP-DD recess whereas the optical interface 114, the handle 116, and a portion of the shell 118 remain outside of the QSFP-DD recess. One part of the shell 118 that does not enter inside the QSFP-DD recess when the QSFP-DD optical module 110 is plugged into a QSFP-DD recess has a flat portion 120. For a type 2 QSFP-DD optical module, it is expected that the flat portion will be limited to a maximum width of 19 mm and a maximum depth of 35 mm; for a type 1 QSFP-DD optical module, it is expected that the flat portion will be limited to a maximum width of 19 mm and a maximum depth of 20 mm. Those dimensions define an enlarged section of an optical module transceiver that extends outside of an accommodating cage and is for accommodating an optical mating plug and actuator mechanism.

Figure 2:
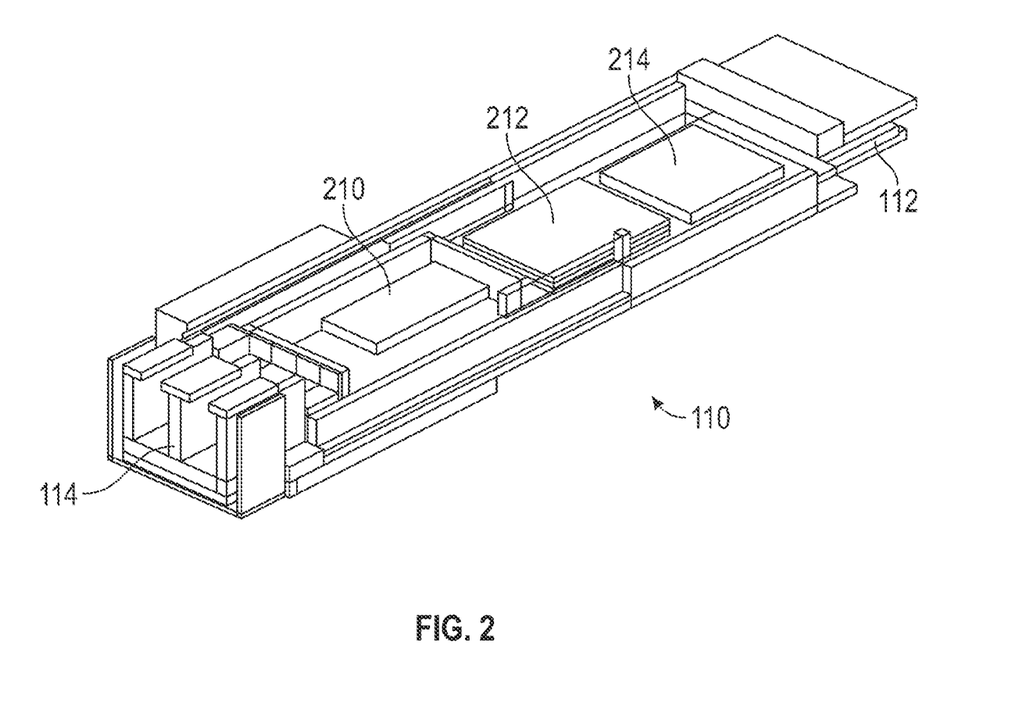
FIG. 2 is a cutaway perspective view of a QSFP-DD optical module.

FIG. 2 is a cutaway perspective view of a QSFP-DD optical module 110 showing aspects of the innards thereof. The QSFP-DD optical module 110 has conversion circuitry including an Integrated Coherent Transmitter-Receiver Optical Sub-Assembly (IC-TROSA) 210 at which optical signals received at the optical interface 114 are converted into electrical ones and vice versa. The IC-TROSA 210 is large and lies in the portion of the shell 118 that does not enter inside the QSFP-DD recess when the QSFP-DD optical module 110 is plugged into a QSFP-DD recess. The IC-TROSA 210 is the most demanding of the components of the QSFP-DD optical module with respect to temperature. In particular, as the speed at which the IC-TROSA 210 is operated increases, so does its power consumption and thus its temperature. As the components of the IC-TROSA are rated to operate below manufacturer-specified maximum temperatures, the operating temperature of the IC-TROSA 210 can effectively act to limit the communication speed of the QSFP-DD optical module 110. The IC-TROSA 210 is connected to a Digital Signal Processor (DSP) 212 which is in turn connected to DC (Direct Current) to DC circuitry 214 which then connects to the electrical interface 112.

Figure 3A:
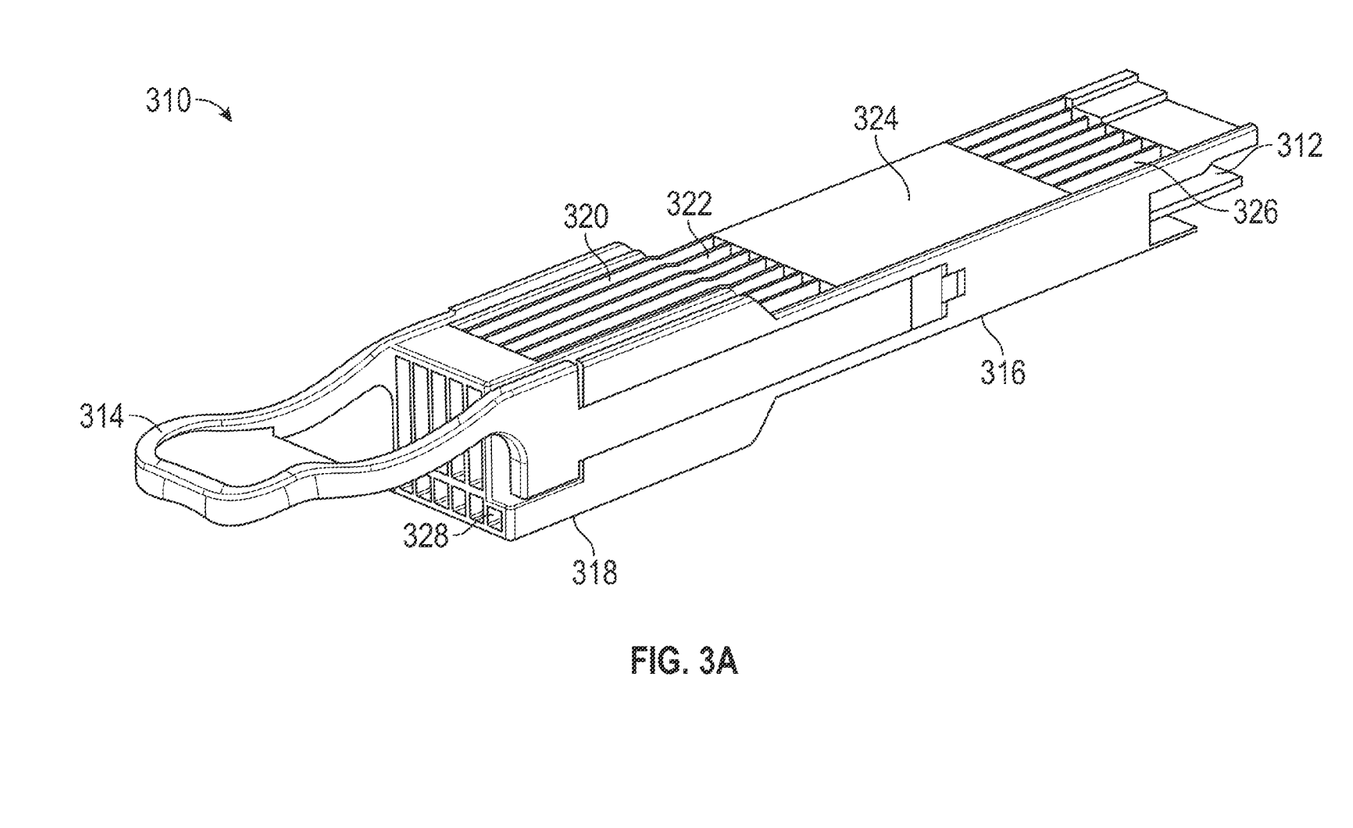
FIGS. 3a and 3b are perspectives view of a QSFP-DD module having a projection for contacting a QSFP-DD optical module.
Figure 3B:
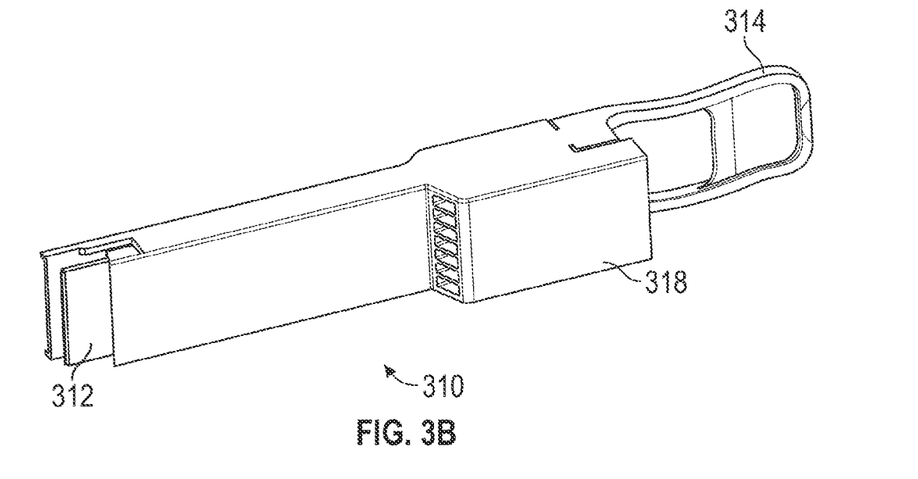

FIGS. 3a and 3b are perspective views of a QSFP-DD module 310 having a projection for contacting a QSFP-DD optical module. The QSFP-DD module 310 being removably pluggable into one or more optical module recesses—for example those of a QSFP-DD cage. The QSFP-DD module 310 has a form factor enabling it to be inserted into a QSFP-DD recess of a cage in a network device (not shown). In this case, the QSFP-DD module 310 has an electrical interface 312 for engaging with the electrical interface of the case (either only physically or both physically and electrically) and a handle 314 for facilitating insertion and extraction of the QSFP-DD module into and out of QSFP-DD recesses. Relative to the bottom side 316 of the QSFP-DD module 310, the QSFP-DD module 310 has a projection 318. As the ASM sets out the separation between adjacent QSFP-DD recesses (for example when QSFP-DD Double Density (QSFP-DD) 2×1 configurations are employed, such configurations being arranged to receive two QSFP-DD optical modules one on top of the other), the projection 318 is arranged so that, when the QSFP-DD module 310 is plugged into one of the QSFP-DD recesses of a cage and a QSFP-DD optical module 110 is plugged into an adjacent one of the QSFP-DD recesses, the projection 318 physically contacts the flat portion 120 of the adjacent QSFP-DD optical module 110. Although FIG. 3 shows a QSFP-DD module 310 having only a single projection 318, the projection could instead take the form of a plurality of projections, also the handle 314 and an electrical interface 312 for engaging with the electrical interface of the case may in some examples not be present. Also, the QSFP-DD module 310 may have no electro-optical data transport functionality.

A consequence of the projection 318 physically contacting the flat portion 120 of the adjacent QSFP-DD optical module 110 is that the projection may conduct heat away from the flat portion 120 of the adjacent QSFP-DD optical module 110 thereby acting as a heat sink for the optical module 110 and thus allowing the adjacent QSFP-DD optical module 110 to operate at a greater speed than if the projection 318 were not in contact with the flat portion 120. In other words, thermal energy may be conveyed to the module from an adjacent QSFP-DD optical module via the projection(s) (318). Also, the temperature to the touch of the QSFP-DD optical module 110 may be reduced—thereby reducing the danger of operator injury or discomfort.

To facilitate operation of the QSFP-DD module 310 as a heat sink, the QSFP-DD module 310 may comprise one or more: fins, further projections, troughs, undulations, holes, pipes, tubes, and/or vias. These may increase the surface area of the QSFP-DD module 310 and/or encourage air flow relative to the projection 318—for example so as to draw heat away from the projection. In the example of FIG. 3, the QSFP-DD module 310 has a plurality of fins 320 on a top surface thereof as well as corresponding troughs 322. The QSFP-DD module 310 also has a flat interface portion 324 for thermally contacting an internal heat sink of a QSFP-DD recess when the QSFP-DD module is inserted therein. Further troughs 326 can be seen adjacent to the flat portion 324 and would act to facilitate internal air flow and cooling when the QSFP-DD module 310 is plugged into a QSFP-DD cage. The projection 318 also has a plurality of holes 328 for increasing cooling. The presence of the projection 318 and any further projections, troughs, undulations, holes, pipes, tubes, and/or vias increases the surface area of the QSFP-DD module 310 that is available for cooling, but may also increase the area that could be touched by a user, thereby increasing the chances of a user touching the QSFP-DD module 310 at a point thereon where the temperature is unpleasant or damaging for the user.

In some examples, the projection 318 and some or all of the rest of the QSFP-DD module 310 are made of materials that conduct heat well, for example a metal such as copper, aluminium, brass steel, bronze, etc. or alloy(s) thereof. The electrical interface 312 may include etched metal traces functioning as the pins. In one example, the metal traces may be gold-plated. The electrical interface 312 with these metal traces may serve as a male connector or plug which is configured to be inserted into a QSFP-DD recess of a cage of the network device (e.g., a connector socket installed on a host card).

Figure 4:
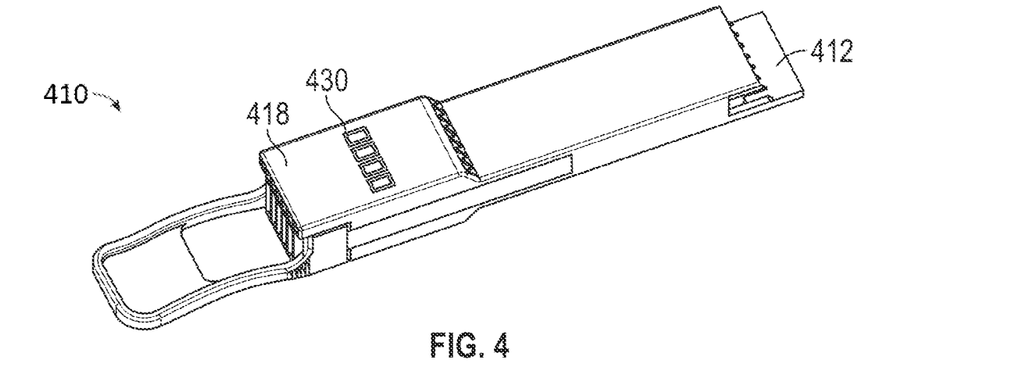
FIG. 4 is a perspective view of a QSFP-DD module having a projection for electrically contacting a QSFP-DD optical module.
Figure 5:
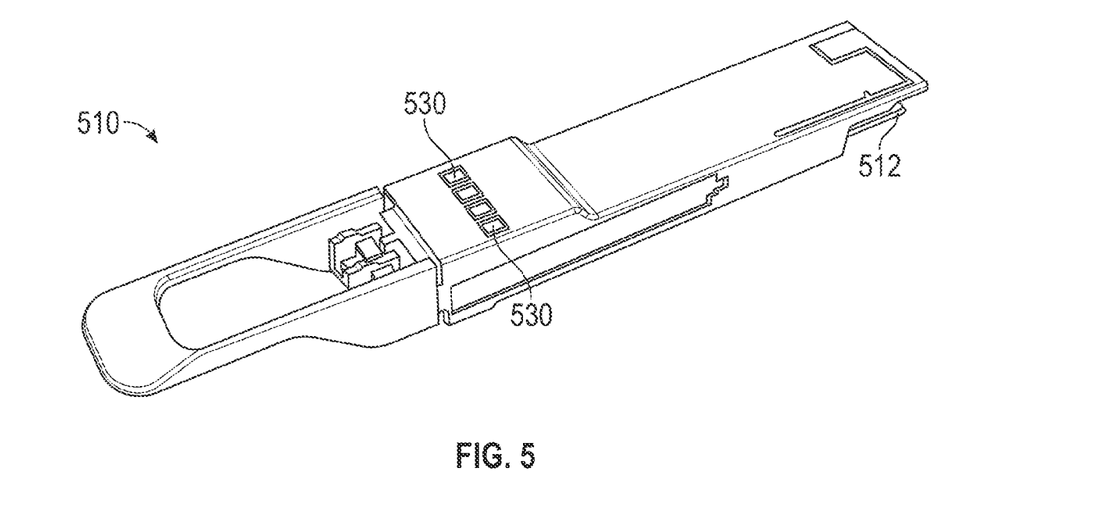
FIG. 5 is a perspective view of a QSFP-DD optical module having electrical contacts for electrically contacting a QSFP-DD module.

Additionally or alternatively, and as shown in FIG. 4, the projections may include one or more electrical contacts 430 for engaging with corresponding electrical contacts 530 on an adjacent QSFP-DD optical module 510 (as shown in FIG. 5). Electrical contacts 430 may be connected inside the QSFP-DD optical module 410 with the supply pins of an electrical interface (e.g., similar to electrical interface 312). The electrical interface may thus provide power to the electrical contacts 430, which may in turn provide the power to the adjacent QSFP-DD optical module 510 over the interface pins 530. Electrical contacts 430 and 530 may be in physical contact with each other, and may be sliding contacts in one example.

As the ASM sets out pin sizes for electrical interfaces between QSFP-DD optical modules and cages, by providing an electrical connection between the QSFP-DD module 410 and the QSFP-DD optical module 510, the cross sectional area of pins available for supplying electrical power to the QSFP-DD module 510 can effectively be doubled as pins of the electrical interface 512 of the QSFP-DD optical module 510 and the pins of the electrical interface of the QSFP-DD module can both be used to draw electrical power from a QSFP-DD cage (not shown) into which it is plugged for powering optical to electrical and/or electrical to optical conversion circuitry (not shown) of the adjacent QSFP-DD optical module 510. In other words, electrical energy may be conveyed from the module to an adjacent QSFP-DD optical module via the projection(s) (418). For example, where 6 pins are available for drawing power per QSFP-DD optical module and each pin has a rating of 1 A, only 6 A are available for powering each QSFP-DD optical module. However, when the QSFP-DD module 410 is employed adjacent to a QSFP-DD optical module 510, as the QSFP-DD module 410 can also draw power from six pins rated at 1 A each, the QSFP-DD module 410 can draw 6 A itself and supply them to the QSFP-DD optical module 510 so that the optical module 510 is supplied with a total of 12 A. As one possibility, the QSFP-DD optical module 510 may be a QSFP optical module.

The electrical interface between QSFP-DD optical modules 410 and 510 provided by the electrical contacts 430 and 530 is not necessarily limited to the supply of power and ground. The electrical interface may also provide other non-power related signals to enable the QSFP-DD optical module 510 to fully or partially access the electrical connector of QSFP-DD optical module 410. The electrical connector may also be used as a communication interface to source electrical functional blocks from the QSFP-DD optical module 510 to QSFP-DD optical module 410, thereby extending the capabilities of QSFP-DD optical module 510. The QSFP-DD optical module 410 may also include housing 412.

Figure 6A:
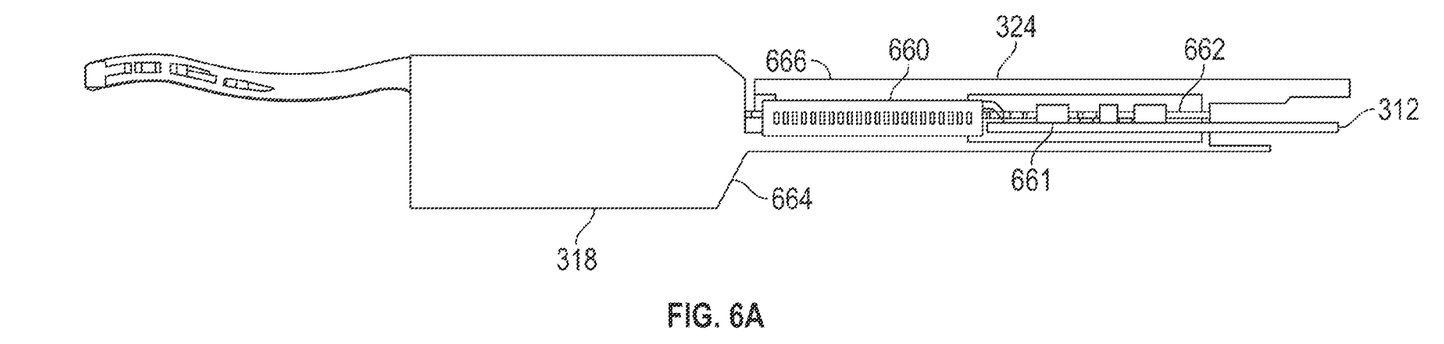
Figure 6B:
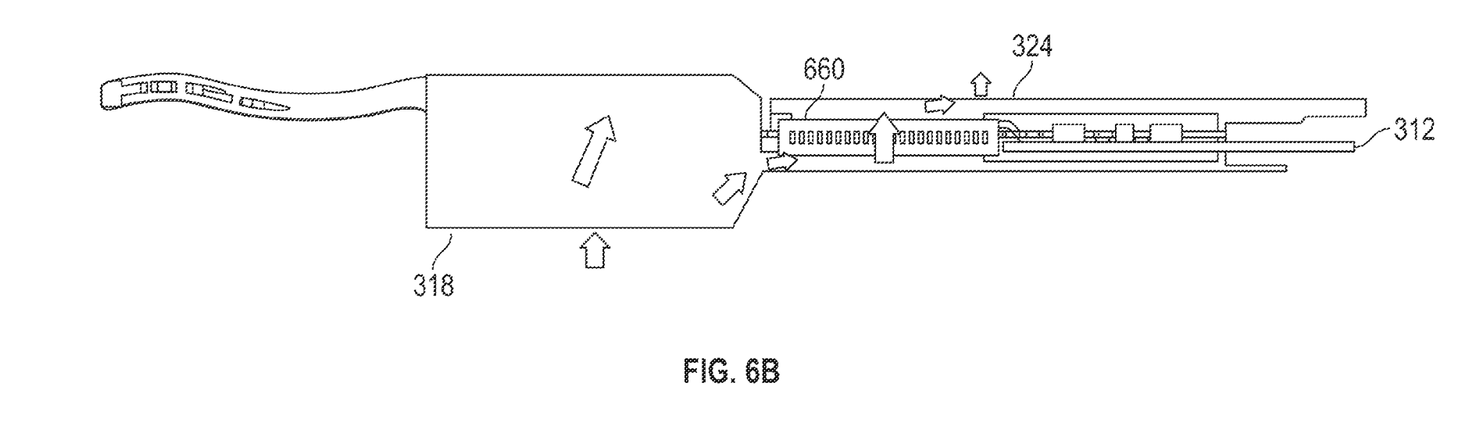

Additionally or alternatively, the QSFP-DD module 310 may use its electrical interface 312 to draw power from a QSFP-DD cage (not shown) into which it is plugged for powering one or more thermoelectric cooling elements 660 (shown in FIG. 6a) arranged to use the Peltier effect to transport heat around the QSFP-DD module 310. For example, a thermoelectric cooling element 660 may be arranged to draw heat from the projection 318 towards the flat portion 324 (as illustrated by the arrows of FIG. 6b) so as to faster transport heat away from QSFP-DD optical module 110 to an internal heat sink of a QSFP-DD recess. In such cases, the QSFP-DD module 310 has control circuitry 661 that is powered via the electrical interface 312 in order to control the one or more thermoelectric cooling elements 660. So as to prevent a thermal short circuit in the QSFP-DD module 310, a thermal insulator (for example a gasket) 662 is provided and the QSFP-DD module 310 has a two-part housing: a first part 664 including the projection(s) 318 and a second part 666 including the flat interface portion 324. The first and second parts of the housing being thermally insulated from one another and the thermoelectric cooling element 660 being arranged to convey thermal energy from the first part of the housing 664 to the second part of the housing 666. Although the use of a powered cooling element will increase the overall amount of heat that needs dissipating, it can move the heat around to a more beneficial dissipation point (an internal heat sink in a QSFP-DD cage) and can help to reduce the touchable temperature adjacent to the handle of the QSFP-DD module—thereby reducing the danger of user injury. Moreover, it can help pull heat away from the QSFP-DD optical module 110 faster than if it were not present—thereby reducing the temperature of the QSFP-DD optical module 110.

Figure 7:
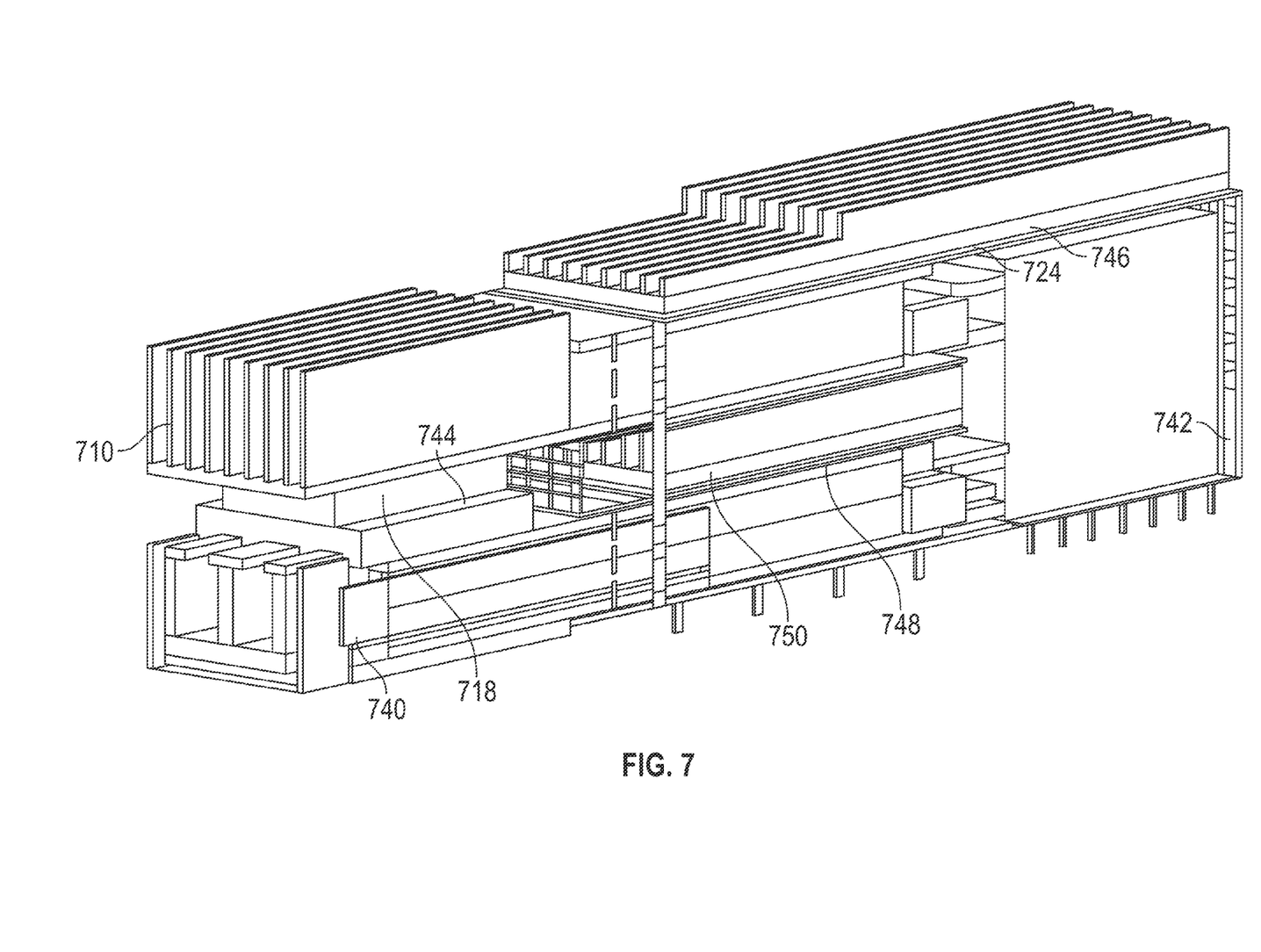
FIG. 7 is a cutaway perspective view of a QSFP-DD module having a projection and a QSFP-DD optical module that are mounted in adjacent QSFP-DD recesses of a 2×1 QSFP-DD cage.

FIG. 7 is a cutaway perspective view of a QSFP-DD module 710 having a projection 718 and a QSFP-DD optical module 740 that are mounted in adjacent QSFP-DD recesses of a 2×1 QSFP-DD cage 742. As can be seen, the projection 718 of the QSFP-DD module 710 is in contact with a flat portion 744 of the QSFP-DD optical module 740. Also, a flat portion 724 of the QSFP-DD module 710 is in contact with an internal heat sink 746 of the 2×1 QSFP-DD cage 742. Likewise, a flat portion 748 of the QSFP-DD optical module 740 is in contact with another internal heat sink 750 of the 2×1 QSFP-DD cage 742.

Figure 8A:
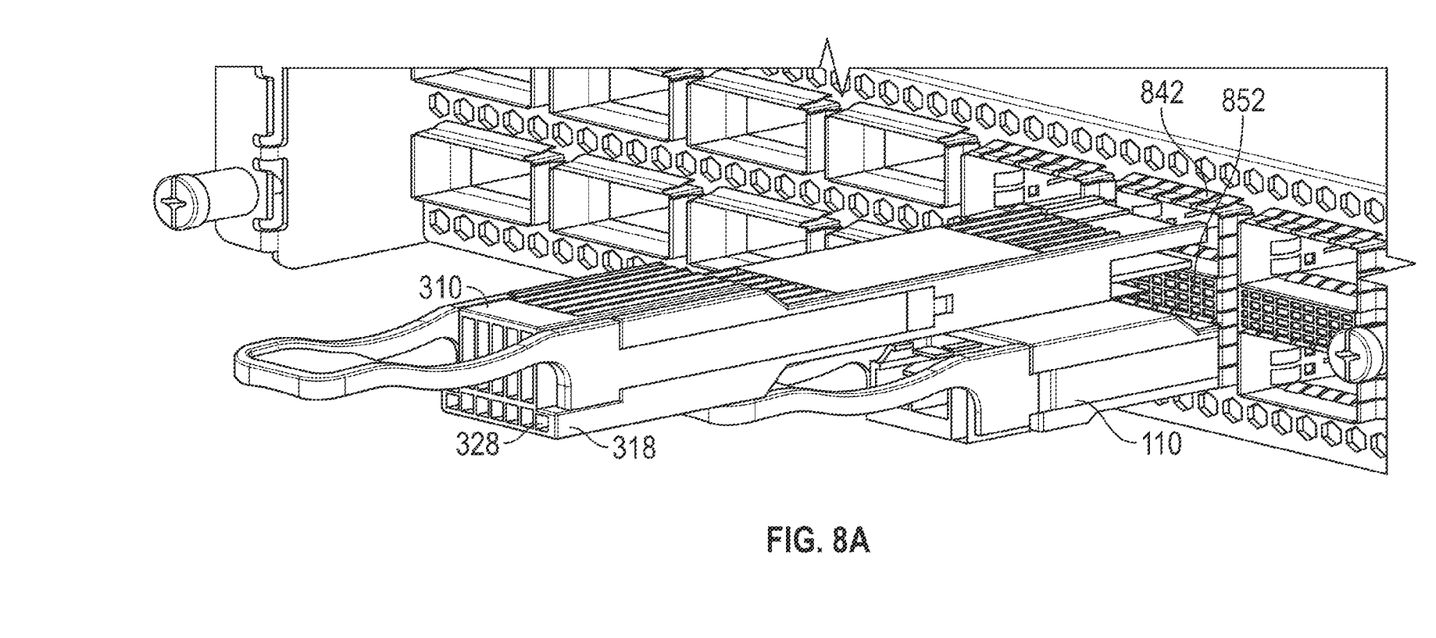
FIGS. 8a, 8b, and 8c are perspective views showing a QSFP-DD module having a projection being progressively introduced into a QSFP-DD recess of a QSFP-DD cage wherein another QSFP-DD recess contains a QSFP-DD optical module.
Figure 8B:
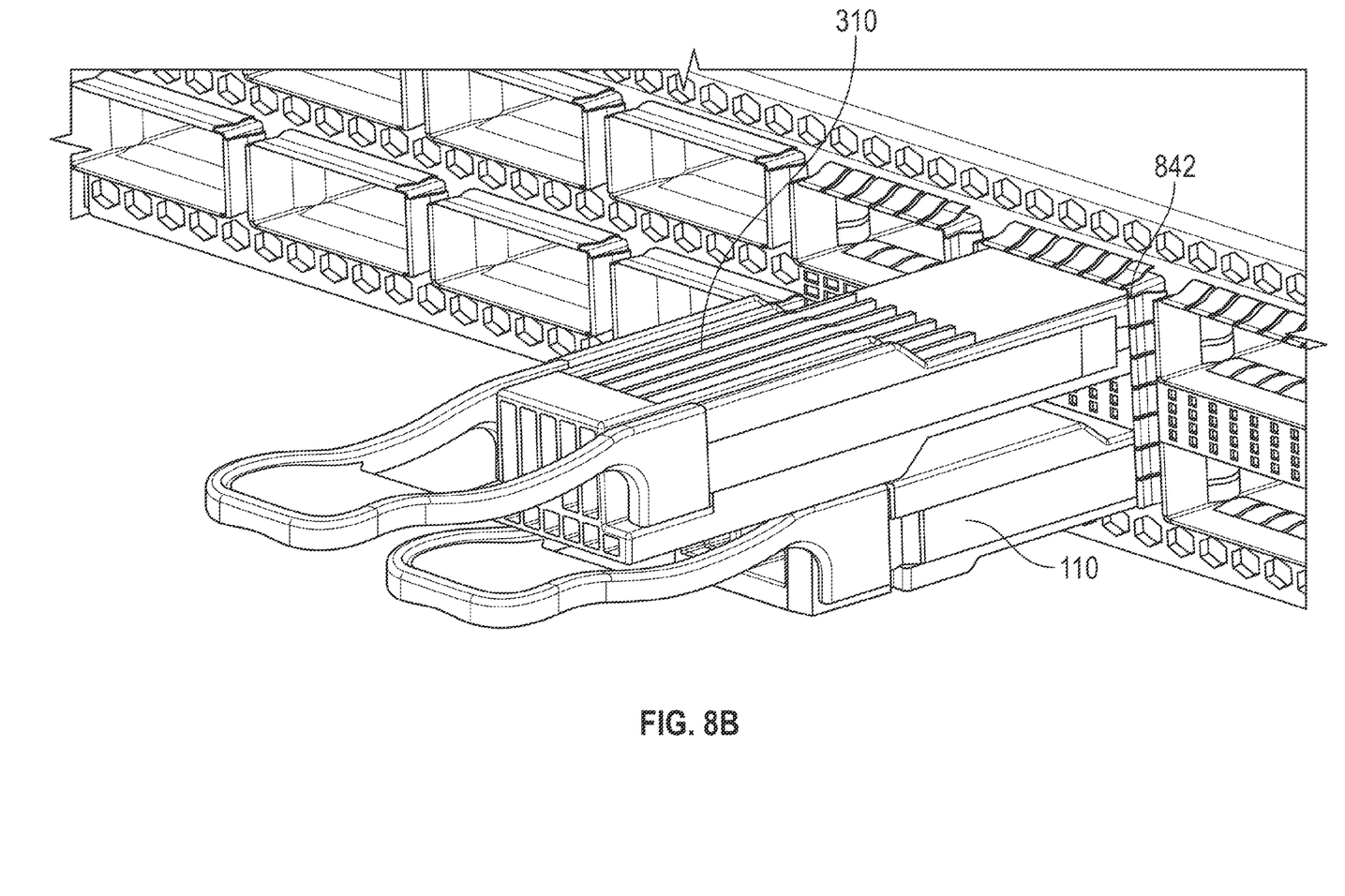
Figure 8C:
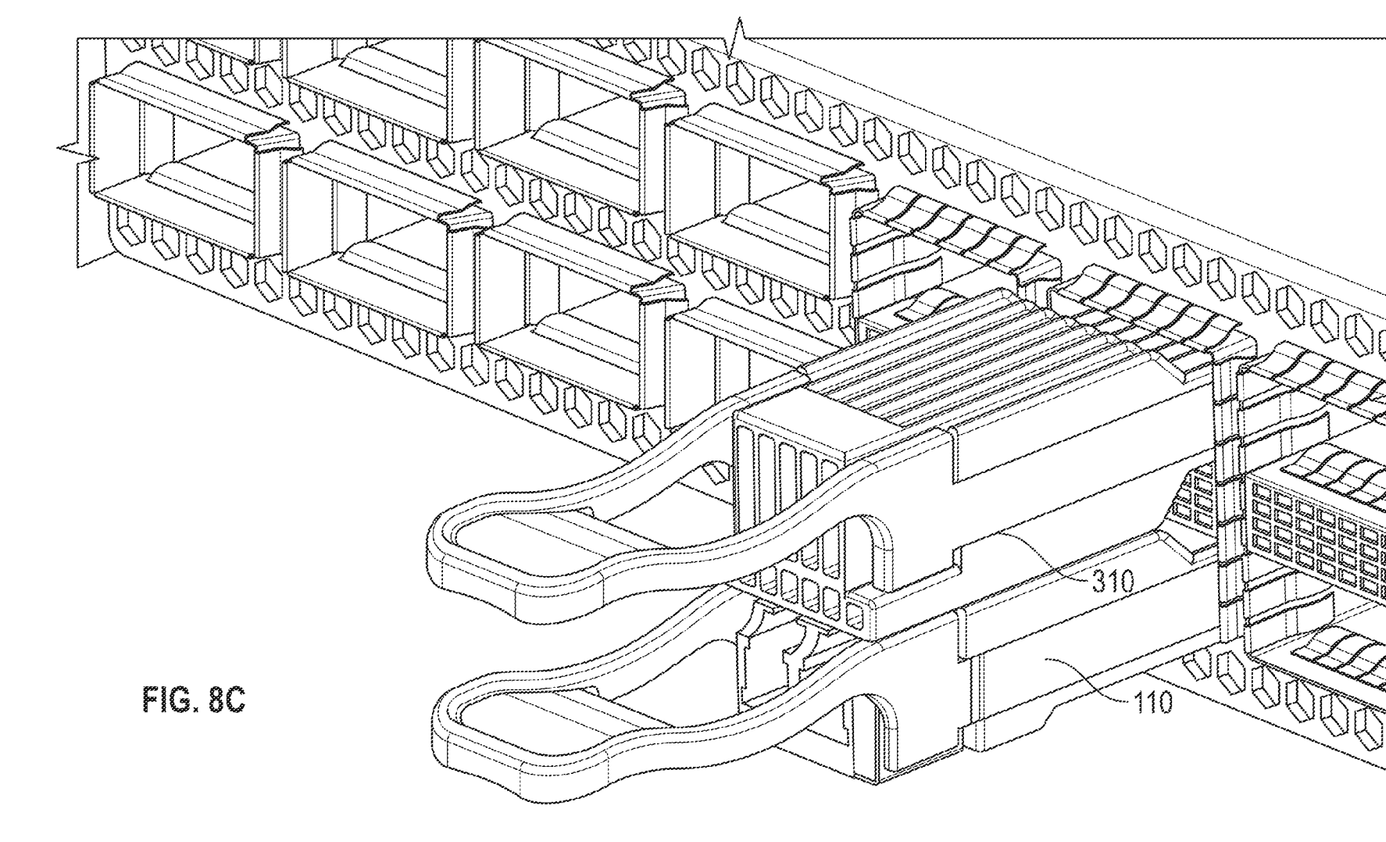

FIGS. 8a to 8c show a QSFP-DD module 310 being progressively inserted into a QSFP-DD recess of a QSFP-DD cage 842. The QSFP-DD recess that the QSFP-DD module 310 is being inserted into is adjacent to another QSFP-DD recess of the QSFP-DD cage 842 that a QSFP-DD optical module 110 has already been inserted into. As can be seen, the QSFP-DD cage 842 has a plurality of air vents 852 in between adjacent QSFP-DD recesses of the QSFP-DD cage 842 so as to allow air to pass between the interior and the exterior of the QSFP-DD cage 842. Due to the projection 318 of the QSFP-DD module 310, insertion of the QSFP-DD module 310 into the QSFP-DD recess as per FIGS. 8a to 8c may partially of wholly occlude the air vents 852, thereby reducing the amount of air that can pass into through the vents 852 for cooling. This may be mitigated somewhat by the inclusion of holes 328 in the projection 318. As one possibility, the holes 328 may be aligned with and/or oriented in the same direction as the vents 852.

Figure 9:
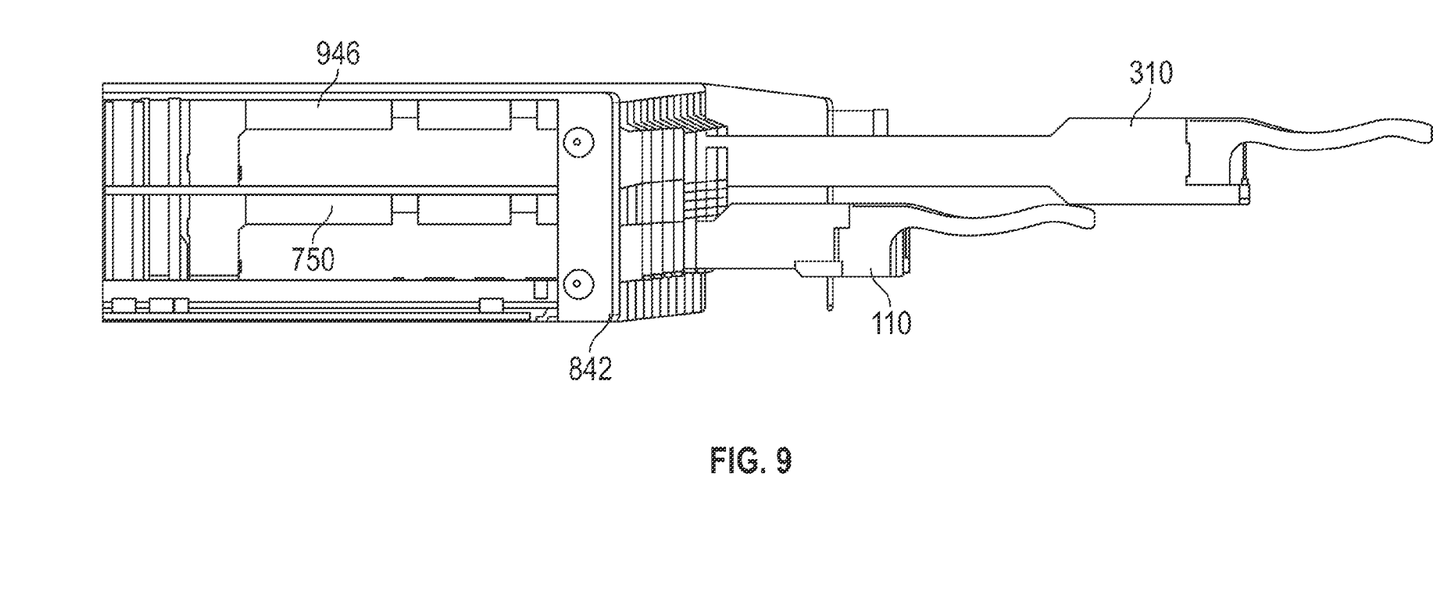

FIG. 9 is a cutaway perspective view of the arrangement of FIG. 8a showing internal heat sinks 946 and 750 of the QSFP-DD cage 842.

Table 1 shows simulation results for a Boss Hogg host card (Ambient temperature=40° C., Volumetric flow=5 cfm, at sea level) for a 24 W QSFP-DD optical module 110 for which power dissipation was 8 W at the IC-TROSA 210 case, 13 W at the DSP 212 junction, and 3 W at the DC to DC circuitry 214. The expected temperature reduction on the touchable area of the QSFP-DD optical module 110 (the portion that projects from the cage when the QSP optical module is plugged into a QSFP-DD cage is up to 15° C.

TABLE 1

| Component | Dissipated power [W] | Temperature without QSFP-DD module 310 [° C.] | Temperature with QSFP-DD module 310 [° C.] |
|---|---|---|---|
| IC-TROSA 210 case | 8 | 97 | 73 |
| DSP 212 junction | 13 | 112 | 98 |

As another possibility, the flat portion 120 of a QSFP-DD optical module 110 (which may be a QSFP-DD optical module) may be used when the QSFP-DD optical module 110 is inserted in a QSFP-DD recess of a QSFP-DD cage to supply electrical power to, and possibly also remove heat from, the QSFP-DD optical module without using a QSFP-DD module having a projection. In such circumstances, an electrical supply, and possibly also a heat sink, would be attached to the flat portion of the QSFP-DD optical module, for example by way of one or more clips or clamps and thus heat would be conducted away from the QSFP-DD optical module 110 and/or electrical power supplied to the QSFPDD optical module There is disclosed a module for plugging into a QSFP-DD cage. The module has one or more projections for contacting a QSFP-DD optical module in an adjacent QSFP-DD recess of the QSFP-DD cage so as to evacuate heat from, and or provide power to, the QSFP-DD optical module.

All approaches described herein with reference to QSFP-DD could equally be applied to QSFP (Quad Form Factor Pluggable) and QSFP+ vice versa. Specifications for QSFP (INF-8438) and QSFP+(SFF-8436) can be found at https://www.snia.org/technology-communities/sff/specifications?field_doc_status_value=Published&combine=QSFP&items_per_page=20.

In one form, a module arranged to plug into an optical module recess of a QSFP-DD cage including a plurality of optical module recesses is provided. The module comprises one or more projections arranged so that, when the module is plugged into one of the optical module recesses and a QSFP-DD optical module is plugged into an adjacent one of the plurality of optical module recesses, the one or more projections contact the QSFP-DD optical module.

In another form, a QSFP-DD optical module arranged to plug into an optical module recess of a QSFP-DD cage is provided. The QSFP-DD optical module comprises: an optical interface for interfacing with an optical fibre; an electrical interface for interfacing with an electrical interface of the QSFP-DD cage when the QSFP-DD optical module is plugged into a recess of the QSFP-DD cage; conversion circuitry for converting at least one of: optical signals received at the optical interface from the optical fibre into electrical signals for outputting by the electrical interface, and electrical signals received at the electrical interface from the electrical interface of the QSFP-DD cage into optical signals for outputting by the optical interface; and a shell having a flat portion that is arranged to project outside the recess of the QSFP-DD cage when the QSFP-DD optical module is plugged thereinto, wherein the flat portion has one or more electrical contacts for receiving electrical power and providing the electrical power to the conversion circuitry.

In another form, a method for configuring a QSFP-DD optical module is provided. The method comprises: interfacing an optical interface of the QSFP-DD optical module with an optical fibre; interfacing an electrical interface of the QSFP-DD optical module with an electrical interface of a QSFP-DD cage when the QSFP-DD optical module is plugged into a recess of the QSFP-DD cage; converting at least one of: optical signals received at the optical interface of the QSFP-DD optical module from the optical fibre into electrical signals for outputting by the electrical interface of the QSFP-DD optical module, and electrical signals received at the electrical interface of the QSFP-DD optical module from the electrical interface of the QSFP-DD cage into optical signals for outputting by the optical interface of the QSFP-DD optical module; and attaching, to a flat portion of a shell that is arranged to project outside the recess of the QSFP-DD cage when the QSFP-DD optical module is plugged thereinto, one or more electrical contacts for providing electrical power to the QSFP-DD optical module.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described but can be practiced with modification and alteration within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A Quad Small Form Factor Pluggable Double Density (QSFP-DD) optical module arranged to plug into an optical module recess of a QSFP-DD cage, the QSFP-DD optical module comprising:
    an optical interface for interfacing with an optical fibre;
    an electrical interface for interfacing with an electrical interface of the QSFP-DD cage when the QSFP-DD optical module is plugged into the optical module recess of the QSFP-DD cage;
    conversion circuitry for converting at least one of:
        optical signals received at the optical interface from the optical fibre into electrical signals for outputting by the electrical interface, and
        electrical signals received at the electrical interface from the electrical interface of the QSFP-DD cage into optical signals for outputting by the optical interface; and
    a shell having a flat portion that is arranged to project outside the optical module recess of the QSFP-DD cage when the QSFP-DD optical module is plugged thereinto, wherein the flat portion has one or more electrical contacts for receiving electrical power and providing the electrical power to the conversion circuitry.

2. The QSFP-DD optical module of claim 1, wherein when the QSFP-DD optical module is plugged into the optical module recess of the QSFP-DD cage and a module is plugged into an adjacent recess of the QSFP-DD cage, the one or more electrical contacts receive the electrical power from the module.

3. The QSFP-DD optical module of claim 2, wherein the one or more electrical contacts receive the electrical power from one or more projections of the module.

4. The QSFP-DD optical module of claim 2, wherein the flat portion conveys thermal energy to one or more projections of the module.

5. The QSFP-DD optical module of claim 1, wherein the QSFP-DD cage is a 2×1 QSFP-DD cage.

6. A method comprising:
inserting the QSFP-DD optical module of claim 1 into the optical module recess of the QSFP-DD cage.

7. The method of claim 6, further comprising:
inserting a module into an adjacent recess of the QSFP-DD cage.

8. A method for configuring a Quad Small Form Factor Pluggable Double Density (QSFP-DD) optical module, the method comprising:
providing an optical interface of the QSFP-DD optical module for interfacing with an optical fibre;
providing an electrical interface of the QSFP-DD optical module for interfacing with an electrical interface of a QSFP-DD cage when the QSFP-DD optical module is plugged into an optical module recess of the QSFP-DD cage;
providing conversion circuitry for converting at least one of:
optical signals received at the optical interface of the QSFP-DD optical module from the optical fibre into electrical signals for outputting by the electrical interface of the QSFP-DD optical module, and
electrical signals received at the electrical interface of the QSFP-DD optical module from the electrical interface of the QSFP-DD cage into optical signals for outputting by the optical interface of the QSFP-DD optical module; and
providing, on a flat portion of a shell that is arranged to project outside the optical module recess of the QSFP-DD cage when the QSFP-DD optical module is plugged thereinto, one or more electrical contacts for receiving electrical power and providing the electrical power to the conversion circuitry.

9. The method of claim 8, further comprising:
when the QSFP-DD optical module is plugged into the optical module recess of the QSFP-DD cage and a module is plugged into an adjacent recess of the QSFP-DD cage, receiving the electrical power from the module via the one or more electrical contacts.

10. The method of claim 9, further comprising:
receiving the electrical power from one or more projections of the module via the one or more electrical contacts.

11. The method of claim 9, further comprising:
conveying thermal energy to one or more projections of the module via the flat portion.

12. The method of claim 8, wherein the QSFP-DD cage is a 2×1 QSFP-DD cage.

13. The method of claim 8, further comprising:
inserting the QSFP-DD optical module into the optical module recess of the QSFP-DD cage.

14. The method of claim 13, further comprising:
inserting a module into an adjacent recess of the QSFP-DD cage.

15. An apparatus arranged to plug into an optical module recess of a cage, the apparatus comprising:
an optical interface for interfacing with an optical fibre;
an electrical interface for interfacing with an electrical interface of the cage when the apparatus is plugged into the optical module recess of the cage;
conversion circuitry for converting at least one of:
optical signals received at the optical interface from the optical fibre into electrical signals for outputting by the electrical interface, and
electrical signals received at the electrical interface from the electrical interface of the cage into optical signals for outputting by the optical interface; and
a shell having a flat portion that is arranged to project outside the optical module recess of the cage when the apparatus is plugged thereinto, wherein the flat portion has one or more electrical contacts for receiving electrical power and providing the electrical power to the conversion circuitry.

16. The apparatus of claim 15, wherein when the apparatus is plugged into the optical module recess of the cage and a module is plugged into an adjacent recess of the cage, the one or more electrical contacts receive the electrical power from the module.

17. The apparatus of claim 16, wherein the one or more electrical contacts receive the electrical power from one or more projections of the module.

18. The apparatus of claim 16, wherein the flat portion conveys thermal energy to one or more projections of the module.

19. The apparatus of claim 15, wherein the cage is a 2×1 cage.

20. A method comprising:
inserting the apparatus of claim 15 into the optical module recess of the cage; and
inserting a module into an adjacent recess of the cage.

* * * * *